United States Patent
Lavoie (10) Patent No.: US 10,112,537 B2
(45) Date of Patent: Oct. 30, 2018

(54) TRAILER ANGLE DETECTION TARGET FADE WARNING

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 14/475,999

(22) Filed: Sep. 3, 2014

(65) Prior Publication Data

US 2016/0059780 A1    Mar. 3, 2016

(51) Int. Cl.
B60R 1/00    (2006.01)

(52) U.S. Cl.
CPC .......... *B60R 1/00* (2013.01); *B60R 2300/808* (2013.01)

(58) Field of Classification Search
CPC ...... H04N 19/61; H04N 19/176; H04N 19/46; H04N 19/70; H04N 19/86; H04N 19/117; H04N 19/159; H04N 19/82; H04N 19/136; H04N 19/80
See application file for complete search history.

(56) References Cited

U.S. PATENT DOCUMENTS

| | | |
|---|---|---|
| 4,430,637 A | 2/1984 | Koch-Ducker et al. |
| 5,056,905 A | 10/1991 | Jensen |
| 5,142,278 A | 8/1992 | Moallemi et al. |
| 5,442,810 A | 8/1995 | Jenquin |
| 5,455,557 A | 10/1995 | Noll et al. |
| 5,521,633 A | 5/1996 | Nakajima et al. |
| 5,905,433 A | 5/1999 | Wortham |
| 5,951,035 A | 9/1999 | Phillips, Jr. et al. |
| 5,969,325 A | 10/1999 | Hecht et al. |
| 5,970,619 A | 10/1999 | Wells |

(Continued)

FOREIGN PATENT DOCUMENTS

| | | |
|---|---|---|
| CN | 101610420 A | 12/2009 |
| DE | 3931518 A1 | 4/1991 |

(Continued)

OTHER PUBLICATIONS

Gouet-Brunet, V.; Lameyre, B., "Object recognition and segmentation in videos by connecting heterogeneous visual features", Computer Vision and Image Understanding, Jul. 2008, 2 pgs., vol. 111, Issue 1.

(Continued)

*Primary Examiner* — Farhan Mahmud
(74) *Attorney, Agent, or Firm* — Frank MacKenzie; Price Heneveld LLP (57) ABSTRACT

A method of detecting degradation of an optical target on a trailer. The method includes generating a first set of data corresponding to optical characteristics of an optical target on a trailer. The method also includes generating a second set of data corresponding to optical characteristics of an optical target on a trailer after generating the first set of data. The method further includes providing an alert if differences between the first and second sets of data exceed predefined criteria indicating that the target has degraded. The predefined criteria may comprise fading or other suitable optical characteristics of the target.

20 Claims, 10 Drawing Sheets

(56) References Cited

U.S. PATENT DOCUMENTS

| | | |
|---|---|---|
| 6,100,795 A | 8/2000 | Otterbacher et al. |
| 6,151,175 A | 11/2000 | Osha |
| 6,178,650 B1 | 1/2001 | Thibodeaux |
| 6,217,177 B1 | 4/2001 | Rost |
| 6,318,747 B1 | 11/2001 | Ratican |
| 6,480,104 B1 | 11/2002 | Wall et al. |
| 6,539,288 B2 | 3/2003 | Ishida et al. |
| 6,837,432 B2 | 1/2005 | Tsikos et al. |
| 7,005,974 B2 | 2/2006 | McMahon et al. |
| 7,036,840 B2 | 5/2006 | Kwilinski |
| 7,039,504 B2 | 5/2006 | Tanaka et al. |
| 7,204,504 B2 | 4/2007 | Gehring et al. |
| 7,237,790 B2 | 7/2007 | Gehring et al. |
| 7,309,075 B2 | 12/2007 | Ramsey et al. |
| 7,619,680 B1 | 11/2009 | Bingle et al. |
| 7,744,109 B2 | 6/2010 | Groh |
| 7,760,077 B2 | 7/2010 | Day |
| 7,777,615 B2 | 8/2010 | Okuda et al. |
| 7,904,222 B2 | 3/2011 | Lee et al. |
| 8,010,252 B2 | 8/2011 | Getman et al. |
| 8,038,166 B1 | 10/2011 | Piesinger |
| 8,044,776 B2 | 10/2011 | Schofield et al. |
| 8,068,019 B2 | 11/2011 | Bennie et al. |
| 8,138,899 B2 | 3/2012 | Ghneim |
| 8,165,770 B2 | 4/2012 | Getman et al. |
| 8,179,238 B2 | 5/2012 | Roberts, Sr. et al. |
| 8,191,915 B2 | 6/2012 | Freese et al. |
| 8,279,067 B2 | 10/2012 | Berger et al. |
| 8,332,097 B2 | 12/2012 | Chiba et al. |
| 8,362,888 B2 | 1/2013 | Roberts, Sr. et al. |
| 8,390,696 B2 | 3/2013 | Komoto et al. |
| 8,427,288 B2 | 4/2013 | Schofield et al. |
| 8,451,107 B2 | 5/2013 | Lu et al. |
| 8,755,984 B2 | 6/2014 | Rupp et al. |
| 8,836,786 B2 | 9/2014 | Seger et al. |
| 8,888,120 B2 | 11/2014 | Trevino |
| 8,909,426 B2 | 12/2014 | Rhode et al. |
| 8,930,140 B2 | 1/2015 | Trombley et al. |
| 9,042,603 B2 | 5/2015 | Elwart et al. |
| 9,102,271 B2 | 8/2015 | Trombley et al. |
| 9,132,856 B2 | 9/2015 | Shepard |
| 9,238,483 B2 | 1/2016 | Hafner et al. |
| 9,248,858 B2 | 2/2016 | Lavoie et al. |
| 9,315,151 B2 | 4/2016 | Taylor et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,499,018 B2 | 11/2016 | Gehrke et al. |
| 9,827,818 B2 | 11/2017 | Hu et al. |
| 9,834,049 B2 | 12/2017 | Strand |
| 9,840,278 B2 | 12/2017 | Lavoie et al. |
| 2001/0024333 A1 | 9/2001 | Rost |
| 2002/0149673 A1 | 10/2002 | Hirama et al. |
| 2002/0180973 A1* | 12/2002 | MacKinnon ......... H05B 37/029 356/425 |
| 2003/0234512 A1 | 12/2003 | Holub |
| 2004/0207525 A1 | 10/2004 | Wholey et al. |
| 2005/0074143 A1 | 4/2005 | Kawai |
| 2005/0128059 A1 | 6/2005 | Vause |
| 2005/0206225 A1 | 9/2005 | Offerle et al. |
| 2005/0271402 A1* | 12/2005 | Lee .................... G03G 15/5079 399/24 |
| 2006/0008053 A1* | 1/2006 | Ishikawa ................. H05G 1/30 378/111 |
| 2006/0071447 A1 | 4/2006 | Gehring et al. |
| 2006/0171704 A1 | 8/2006 | Bingle et al. |
| 2006/0244579 A1 | 11/2006 | Raab |
| 2006/0250501 A1 | 11/2006 | Widmann et al. |
| 2007/0132560 A1 | 6/2007 | Nystrom et al. |
| 2007/0285808 A1 | 12/2007 | Beale |
| 2008/0180526 A1 | 7/2008 | Trevino |
| 2008/0231701 A1 | 9/2008 | Greenwood et al. |
| 2008/0231707 A1 | 9/2008 | Fontana |
| 2008/0235224 A1* | 9/2008 | Joseph Rodrigues ...................... G06F 17/30274 |
| 2009/0093928 A1 | 4/2009 | Getman et al. |
| 2009/0231441 A1 | 9/2009 | Walker et al. |
| 2009/0271078 A1 | 10/2009 | Dickinson |
| 2010/0156667 A1 | 6/2010 | Bennie et al. |
| 2010/0324770 A1 | 12/2010 | Ramsey et al. |
| 2011/0025482 A1 | 2/2011 | Alguera et al. |
| 2011/0050903 A1 | 3/2011 | Vorobiev |
| 2011/0216199 A1 | 9/2011 | Trevino et al. |
| 2011/0257860 A1 | 10/2011 | Getman et al. |
| 2011/0290882 A1 | 12/2011 | Gu et al. |
| 2012/0041658 A1 | 2/2012 | Turner |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0288156 A1 | 11/2012 | Kido |
| 2013/0141578 A1 | 6/2013 | Chundrlik, Jr. et al. |
| 2013/0158803 A1 | 6/2013 | Headley |
| 2013/0207834 A1 | 8/2013 | Mizutani et al. |
| 2013/0226390 A1 | 8/2013 | Luo et al. |
| 2013/0268160 A1 | 10/2013 | Trombley et al. |
| 2014/0005918 A1 | 1/2014 | Qiang |
| 2014/0012465 A1* | 1/2014 | Shank ................ B60D 1/58 701/36 |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0085472 A1 | 3/2014 | Lu et al. |
| 2014/0125795 A1* | 5/2014 | Yerke ................... B60R 1/00 348/118 |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0200759 A1 | 7/2014 | Lu et al. |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavioe |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0354811 A1 | 12/2014 | Weber |
| 2014/0358429 A1* | 12/2014 | Shutko ................ G01C 21/3647 701/458 |
| 2014/0379217 A1 | 12/2014 | Rupp et al. |
| 2015/0057903 A1 | 2/2015 | Rhode et al. |
| 2015/0066296 A1 | 3/2015 | Trombley et al. |
| 2015/0077557 A1* | 3/2015 | Han ..................... B60R 11/04 348/148 |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0172582 A1 | 6/2015 | Kiyohara et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2015/0294166 A1* | 10/2015 | Kuehnle ............ G06K 9/00805 701/70 |
| 2016/0023601 A1* | 1/2016 | Windeler ............... B60R 1/00 348/118 |
| 2016/0023603 A1 | 1/2016 | Vico et al. |
| 2016/0039456 A1 | 2/2016 | Lavoie et al. |

(56) References Cited

U.S. PATENT DOCUMENTS

| | | | |
|---|---|---|---|
| 2016/0052548 A1* | 2/2016 | Singh | B60D 1/36 701/37 |
| 2016/0059780 A1 | 3/2016 | Lavoie | |
| 2016/0059888 A1* | 3/2016 | Bradley | B60T 7/22 701/41 |
| 2016/0129939 A1 | 5/2016 | Singh et al. | |
| 2016/0152263 A1 | 6/2016 | Singh et al. | |
| 2016/0272024 A1 | 9/2016 | Bochenek et al. | |
| 2016/0280267 A1 | 9/2016 | Lavoie et al. | |
| 2016/0375831 A1 | 12/2016 | Wang et al. | |
| 2017/0101130 A1 | 4/2017 | Lavoie | |
| 2017/0297619 A1 | 10/2017 | Lavoie et al. | |
| 2017/0297620 A1 | 10/2017 | Lavoie et al. | |
| 2017/0313351 A1 | 11/2017 | Lavoie | |

FOREIGN PATENT DOCUMENTS

| | | |
|---|---|---|
| DE | 9208595 U1 | 8/1992 |
| DE | 10030738 C1 | 8/2001 |
| DE | 10122562 C1 | 7/2002 |
| DE | 10154612 A1 | 5/2003 |
| DE | 10312548 B3 | 5/2004 |
| DE | 102006056408 A1 | 6/2008 |
| DE | 102012005707 A1 | 10/2012 |
| EP | 0418653 A1 | 3/1991 |
| EP | 1312492 A2 | 5/2003 |
| EP | 2644477 A1 | 10/2013 |
| EP | 2682329 A1 | 1/2014 |
| ES | 1134808 | 12/2014 |
| JP | 2002012172 | 1/2002 |
| JP | 2002068032 | 3/2002 |
| JP | 2002068032 A | 3/2002 |
| JP | 3716722 B2 | 11/2005 |
| JP | 2009171122 A | 7/2009 |
| JP | 2012166647 A | 9/2012 |
| JP | 2014146177 | 8/2014 |
| KR | 20140010804 | 1/2014 |
| WO | 2006042665 A1 | 4/2006 |
| WO | 2012103193 A1 | 8/2012 |
| WO | 2013048994 A1 | 4/2013 |
| WO | 2013070539 A1 | 5/2013 |
| WO | 2014174027 A1 | 10/2014 |

OTHER PUBLICATIONS

Alpine Electronics of America, Inc., "Alpine Electronics Introduces Two New Driver Assist Solutions", press release, Jan. 7, 2010, 2 pgs., Torrance, California.

Wagner, M.; Zobel, D.; Meroth, A., "An Adaptive Software and Systems Architecture for Drivers Assistance Systems based on Service Orientation", International Journal of Machine Learning and Computing, Oct. 2011, pp. 359-366, vol. 1, No. 4, Germany.

"Rearview Parking Assist Systems", Donmar Sunroofs & Accessories, Brochure, Aug. 2013, 13 pgs.

"Trailer Vision", Trailer Vision Ltd., Brochure, www.trailervision.co.uk, Date Unknown, 4 pgs.

Stahn et al., "Laser Scanner-Based Navigation for Commercial Vehicles," Article, 2007, 6 pages.

* cited by examiner

TRAILER ANGLE DETECTION TARGET FADE WARNING

FIELD OF THE INVENTION

The present invention generally relates to trailer backup assist systems for vehicles, and more particularly to a method and system for detecting fading or other degradation of a target on a trailer.

BACKGROUND OF THE INVENTION

Reversing a vehicle while towing a trailer is very challenging for many drivers. This is particularly true for drivers that are unskilled at backing vehicles with attached trailers which may include those that drive with a trailer on an infrequent basis (e.g., have rented a trailer, use a personal trailer on an infrequent basis, etc.). One reason for such difficulty is that backing a vehicle with an attached trailer requires steering inputs that are opposite to normal steering when backing the vehicle without a trailer attached and/or requires braking to stabilize the vehicle-trailer combination before a jackknife condition occurs. Another reason for such difficulty is that small errors in steering while backing a vehicle with an attached trailer are amplified thereby causing the trailer to depart from a desired path.

To assist the driver in steering a vehicle with a trailer attached, a trailer backup assist system needs to know the driver's intention. One common assumption with known trailer backup assist systems is that a driver of a vehicle with an attached trailer wants to backup straight and the system either implicitly or explicitly assumes a zero curvature path for the vehicle-trailer combination. Unfortunately most of the real-world use cases of backing a trailer involve a curved path and, thus, assuming a path of zero curvature would significantly limit usefulness of the system. Some known systems assume that a path is known from a map or path planner. To this end, some known trailer backup assist systems operate under a requirement that a trailer backup path is known before backing of the trailer commences such as, for example, from a map or a path-planning algorithm. Undesirably, such implementations of the trailer backup assist systems are known to have a relatively complex human machine interface (HMI) device to specify the path, obstacles and/or goal of the backup maneuver. Furthermore, such systems also require some way to determine how well the desired path is being followed and to know when the desired goal, or stopping point and orientation, has been met, using approaches such as cameras, inertial navigation, or high precision global positioning system (GPS). These requirements lead to a relatively complex and costly system.

Another reason backing a trailer can prove to be difficult is the need to control the vehicle in a manner that limits the potential for a jackknife condition to occur. A trailer has attained a jackknife condition when a hitch angle cannot be reduced (i.e., made less acute) while continuously backing up a trailer by application of a maximum steering input for the vehicle such as, for example, by moving steered front wheels of the vehicle to a maximum steered angle at a maximum rate of steering angle change. In the case of the jackknife angle being achieved, the vehicle must be pulled forward to relieve the hitch angle in order to eliminate the jackknife condition and, thus, allow the hitch angle to be controlled via manipulation of the steered wheels of the vehicle. However, in addition to the jackknife condition creating the inconvenient situation where the vehicle must be pulled forward, it can also lead to damage to the vehicle and/or trailer if certain operating conditions of the vehicle relating to its speed, engine torque, acceleration, and the like are not detected and counteracted. For example, if the vehicle is travelling at a suitably high speed in reverse and/or subjected to a suitably high longitudinal acceleration when the jackknife condition is achieved, the relative movement of the vehicle with respect to the trailer can lead to contact between the vehicle and trailer thereby damaging the trailer and/or the vehicle.

Various trailer backup assist systems and methods have been developed. Such systems may include a target that is placed on a trailer, and a camera that utilizes imaging data of the target to determine a position of a trailer relative to a vehicle. Examples of systems that utilize a target on a trailer are disclosed in U.S. Patent Publication Nos. 2014/0058614, 2014/0058622, 2014/0058655, 2014/0058668, U.S. patent application Ser. No. 14/198,753 filed on Mar. 6, 2014, now U.S. Pat. No. 9,296,421 issued on Mar. 29, 2016, U.S. patent application Ser. No. 14/249,781 filed on Apr. 10, 2014, now U.S. Pat. No. 9,374,562 issued on Jun. 21, 2016, U.S. patent application Ser. No. 14/290,243 filed on May 29, 2014, now U.S. Pat. No. 9,723,274 issued on Aug. 1, 2017, and U.S. patent application Ser. No. 14/313,310 filed on Jun. 24, 2014, now Pat. No. 9,296,422 issued on Mar. 29, 2016. Each of the above-identified patent applications is hereby incorporated herein by reference.

SUMMARY OF THE INVENTION

One aspect of the present invention is a method of detecting degradation of an optical target on a trailer. The method includes generating a first set of data corresponding to optical characteristics of an optical target on a trailer. The method also includes generating a second set of data corresponding to optical characteristics of an optical target on a trailer. The second set of data is generated after the first set of data is generated. The method further includes providing an alert if differences between the first and second sets of data exceed predefined criteria indicating that the target has degraded. The predefined criteria may comprise fading or other suitable optical characteristics of the target.

Another aspect of the present invention is a method of detecting fading of a target on a trailer. The method includes generating first and second images of a target on trailer utilizing a vehicle-mounted camera at chronologically spaced apart times. First and second sets of image histogram data corresponding to the first and second images are generated. An alert is generated if differences between the first and second sets of image histogram data satisfy predefined criteria indicating that the target has faded.

Another aspect of the present invention is a system for detecting degradation of a target on a trailer. The system includes a target defining optical properties, wherein the target is configured to be mounted to a trailer. The system includes a camera that is configured to generate image data of the target to provide input to a trailer backup assist system. A controller is configured to utilize image data from the camera generated at chronologically spaced first and second times to determine if at least one of the optical properties of the target has sufficiently degraded according to predefined criteria. The system is configured to generate an alert if at least one of the optical properties of the target has degraded sufficiently.

These and other aspects, objects, and features of the present invention will be understood and appreciated by

DETAILED DESCRIPTION OF THE PREFERRED EMBODIMENTS

Figure 1:
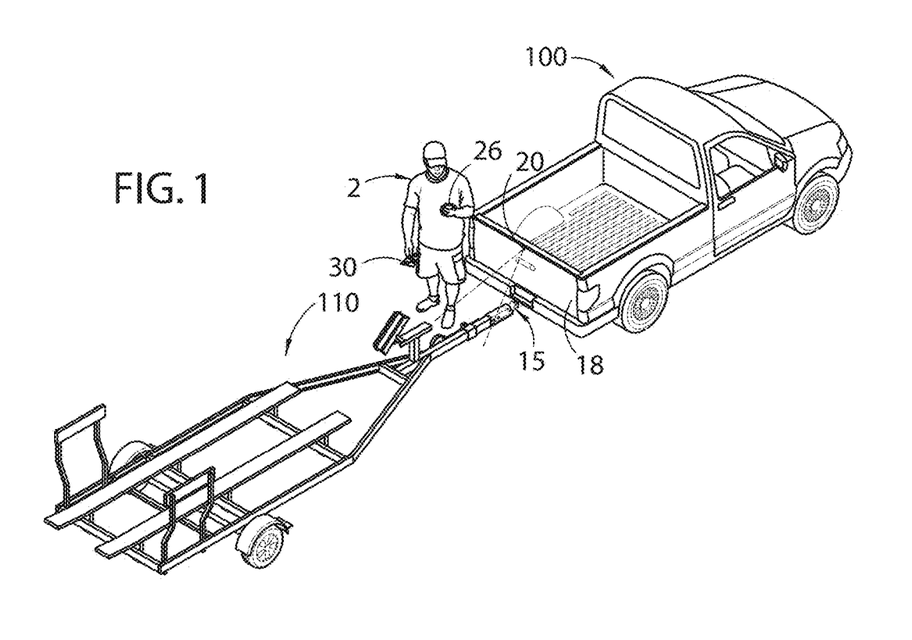
FIG. 1 is an isometric view of a vehicle and trailer according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle 100 is connected to a trailer 110 by a conventional hitch 15. Vehicle 100 may include a camera 20 that is configured to generate one or more images of a target 30 (see also FIG. 2) that may be positioned on an upper surface 112 of trailer 110 by a user 2. As discussed in more detail in U.S. Patent Publication No. 2014/0058622, vehicle 100 includes a trailer backup assist system that utilizes image data corresponding to target 30 to determine the angle and position of trailer 110 relative to vehicle 100.

Figure 2:
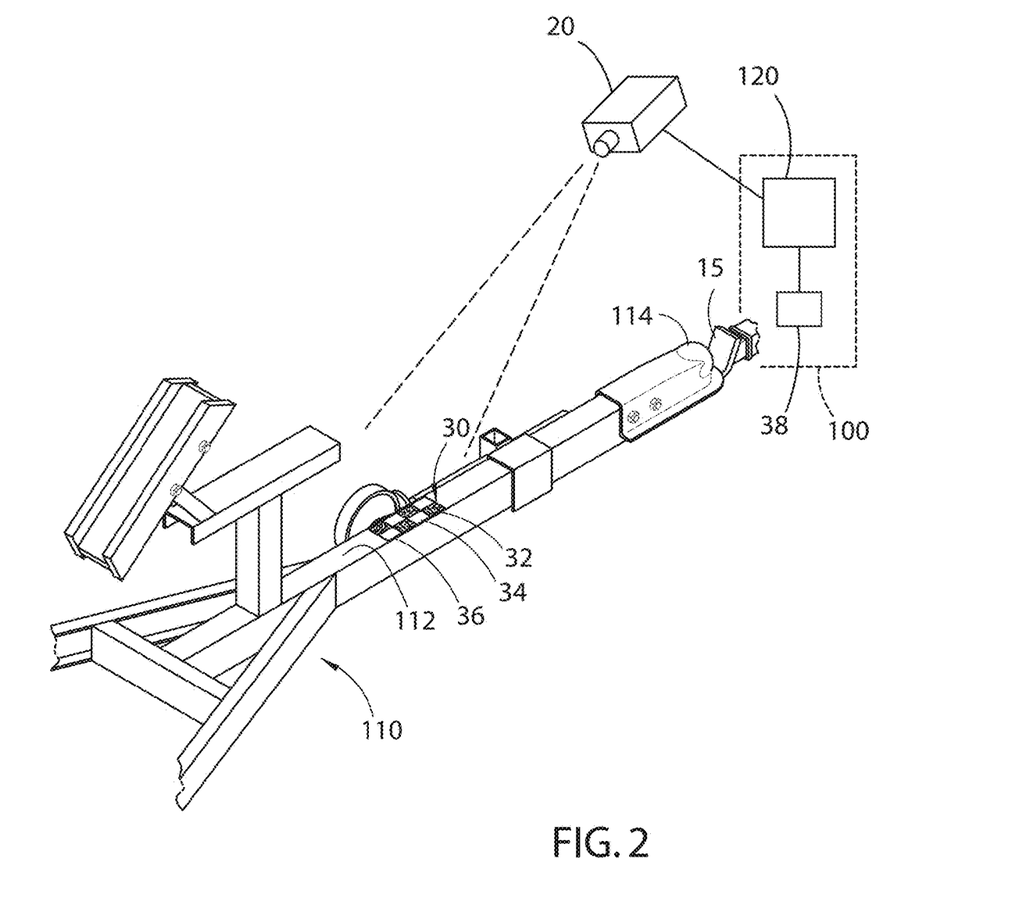
FIG. 2 is a partially fragmentary isometric view of a portion of the trailer of FIG. 1.

Referring to FIG. 2, target 30 may include one or more first areas 32 and one or more second areas 34. First areas 32 may comprise a first color, and second areas 34 may comprise a second color. For example, the first areas 32 may comprise black, blue, green, or red color, and the second areas 34 may comprise the color white. Target 30 may comprise two colors, three colors, or more colors as required for a particular application. As discussed in more detail below, camera 20 may comprise a color camera that generates image data corresponding to the colors of first areas 32 and second areas 34. Camera 20 may be operably connected to a controller such as the trailer back-up assist control module 120 described in more detail in U.S. Patent Publication No. 2014/0058622, or other suitable controller. The controller may be configured to sense or determine the perimeter or edge 36 of target 30, and screen out or remove image data falling outside of the perimeter 36 to thereby generate image data corresponding to target 30. As discussed in more detail below in connection with FIGS. 5-8, camera 20 and/or controller 120 may be configured to generate image data corresponding to image histograms that can be utilized to determine if the colors of target 30 have faded or otherwise degraded.

Figure 3:
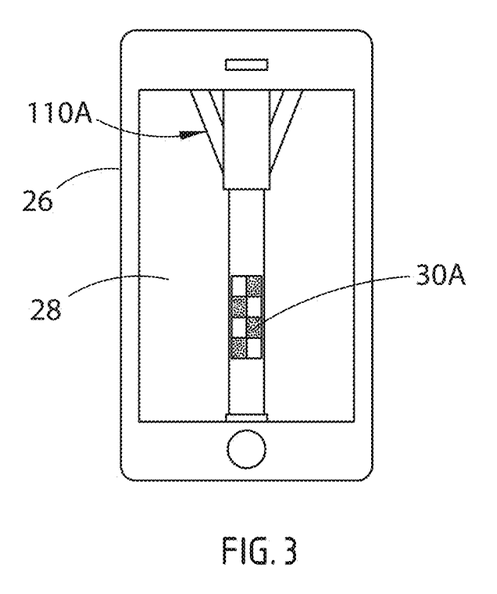
FIG. 3 is a plan view of a portable electronic device including a display screen.

With further reference to FIG. 3, a hand held portable electronic device such as a mobile phone 26 having a display screen 28 and camera may also be utilized to generate an image 110A of trailer 110 including an image 30A of target 30. The vehicle 100 may include a wireless communication device 38 that provides for transmitting and receiving signals to and from portable device 26. The transmitter/receiver 38 is operably connected to controller 120. In use, a user 2 can take a photograph of target 30 utilizing portable device 26, and the image data can be transmitted to transmitter/receiver 38, and the image data can then be utilized by controller 120 to determine if the target 30 has faded or otherwise degraded. In general, the system may be configured to process image data from camera 20 and/or mobile phone 26 and/or other devices capable of generating image data corresponding to target 30. It will be understood that various cameras or the like could be utilized to generate image data for target 30, and the image data may be processed by controller 120, portable device 26, and/or other suitable processors/controllers that could be on board vehicle 100, or remote from vehicle 100.

Figure 4:
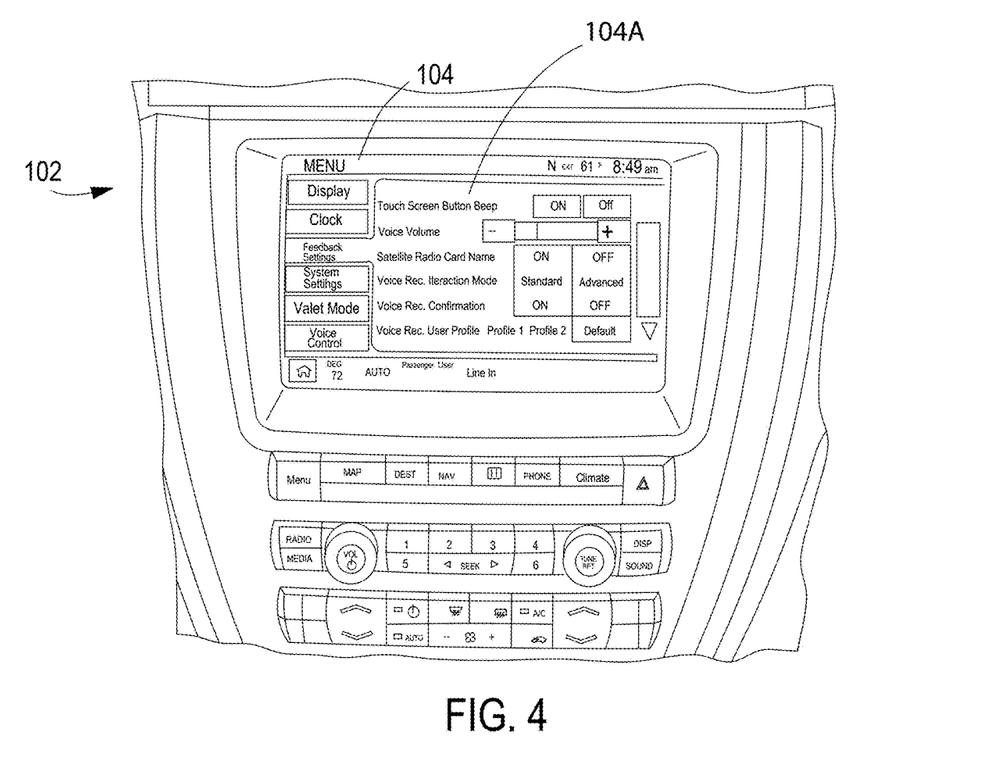
FIG. 4 is a partially fragmentary isometric view of a portion of a vehicle interior showing a human-machine interface.

With further reference to FIG. 4, vehicle 100 may include a human machine interface (HMI) device 102 located in a vehicle interior. For example, the HMI device 102 may be positioned on a central portion of the dashboard above a center console. The HMI device 102 may include a plurality of displays such as menu 104 that are displayed on a display screen 104A. The display screen 104A may comprise a touch screen that permits user input and also displays messages that can be observed by a user 2 seated in vehicle 100. If camera 20 and/or controller 120 determine that target 30 has faded or otherwise degraded by an amount that meets or exceeds predefined criteria, controller 120 may be configured to cause display screen 104A to display an alert or warning. The warning may communicate to the driver that the target is in need of immediate replacement and/or the expected life of the target (e.g. the predicted number of days remaining until the target would need to be replaced). The warning could be displayed as a number, a graduated color bar, or a gauge. The alert could also comprise a written message such as "replace target on trailer." The controller 120 may also be configured to provide other types of alerts such as a colored overlay on an image of the target, one or more flashing lights, one or more audio signals, or a signal to a remote computer or to display device 26 to thereby alert a user 2 that the target 30 needs to be replaced. For example, the display screen 104A may provide an image of the target and the image may glow yellow when the target needs to be replaced within two months and glow red when the target needs to be replaced as soon as possible.

Figure 5:
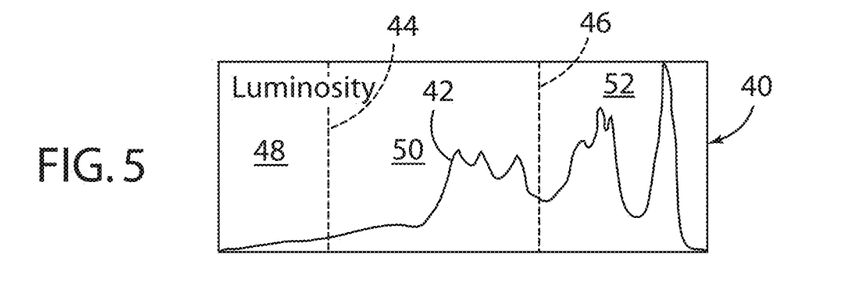
FIG. 5 is an image histogram showing the luminosity of an image of the target.

Camera 20 may comprise a digital camera that generates image data in the form of pixels. With further reference to FIG. 5, the data may be utilized to generate an image histogram 40 wherein line 42 corresponds to the luminosity of the image of the target 30 over a tonal range. The vertical axis of image histogram 40 comprises the number of pixels (i.e. pixel count), and the horizontal axis represents the tonal range. In the illustrated example, vertical lines 44 and 46 divide the image histogram 40 into a region 48 corresponding to shadows, a region 50 corresponding to midtones, and a region 52 corresponding to highlights. The line 42 may comprise a weighted summation of a plurality of colors. For example, if red green and blue (RGB) are utilized to form image histogram 40, red and green may be weighted at 40 percent, and blue may be weighted at 20 percent, such that the line 40 is the sum of (r×0.4)+(g×0.40)+(b×0.20). It will be understood that the weighting of each color may be selected as required depending upon the colors of the first and second areas 32 and 34 (FIG. 2) of target 30. Also, it will be understood that the colors utilized to form image histogram 40 could comprise other colors, or a single color. For example, target 30 may comprise first areas 32 that are black, and second areas 34 that are white. Other color spaces such as CMYK color spaces may also be utilized. It will be understood that image histogram 40 may comprise virtually any image data or combination of data that provides useful data concerning the target 30.

As discussed in more detail below in connection with FIG. 9, in use a reference image and/or reference image data (e.g. image histogram 40) for target 30 is initially generated, and the reference data is stored. Additional reference image data is generated at a later time, and the additional image data is compared to the reference image data to determine if target 30 has faded or otherwise degraded. In the event the target has faded an amount exceeding a predefined threshold, controller 120 generates an alert to the user utilizing HMI device 102 or other suitable communication device.

Figure 6:
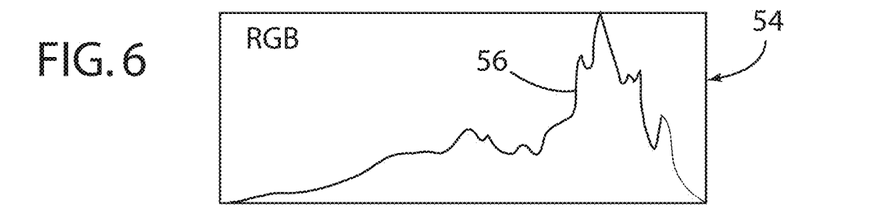
FIG. 6 is a red, green, blue (RGB) over laid.

With further reference to FIG. 6, an RGB image histogram 54 may also be utilized by controller 120 to determine if target 30 has faded according to predefined criteria. In the RGB image histogram 54, line 56 comprises the sum of the individual histograms (not shown) for each separate color channel (i.e. RGB), regardless of whether or not each color came from the same pixel.

Figure 7:
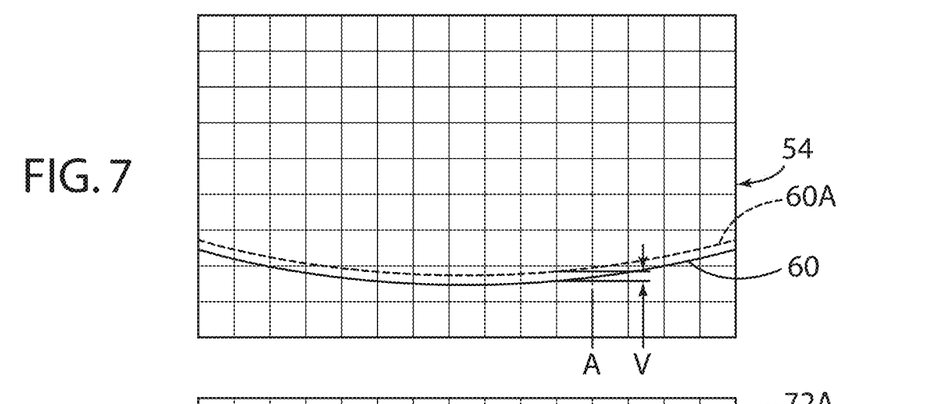
FIG. 7 is an RGB histogram.
Figure 8:
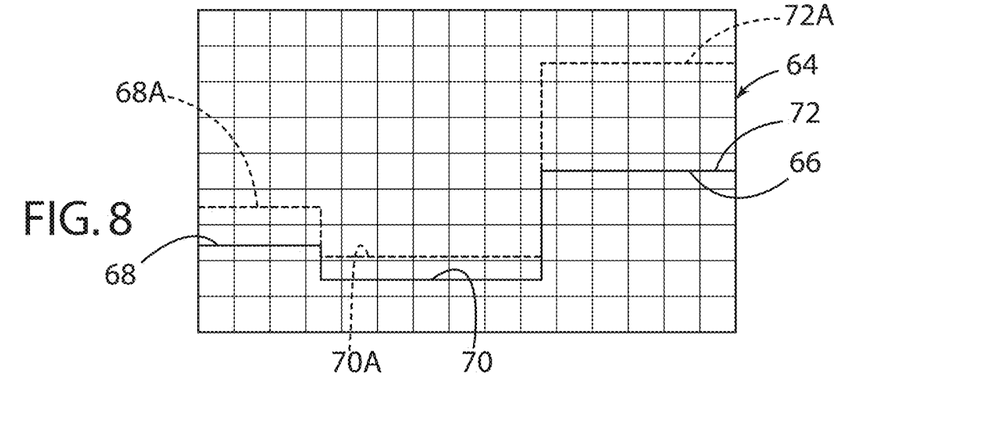
FIG. 8 is an RGB histogram.

FIGS. 7 and 8 show additional image histograms 54 and 64, respectively. Histogram 54 includes a first line 60 comprising reference image data, and a second line 60A representing image data obtained by camera 20 at a later time. The differences between lines 60 and 60A may be utilized to determine changes in the colors of target 30. For example, the vertical distance "V" between lines 60 and 60A at a particular point "A" on the tonal range (horizontal axis) may be utilized as a criteria to determine if a predefined maximum allowable amount of fading has occurred. For example, if target 30 includes red colors in first areas 32, the point "A" may be chosen to correspond to the color red. If the change in luminosity "V" at the point A exceeds a predefined numerical amount (e.g. 100 lx), an alert may be generated by controller 120. Alternatively, the change in luminosity "V" may be compared to the luminosity of the reference image data, and a percentage change in luminosity may be utilized as the predefined criteria with respect to fading. For example, if the luminosity at a particular wavelength (color) decreases by more than a selected amount (e.g. 25%), controller 120 may be configured to generate an alert. Furthermore, a plurality of sets of image data may be generated at set time intervals (e.g. once per week or month), and changes in the image data over time can be utilized to predict when target 30 will need to be replaced. Also, multiple sets of image data taken at a series of different times can be averaged or used to provide a curve fit to thereby reduce the chances that variations in the readings lead to an erroneous warning being given.

With further reference to FIG. 8, an image histogram 64 may include a line 66 having first, second, and third portions 68, 70, and 72, respectively, corresponding to different colors of areas of target 30. The line 66 may comprise reference image data, and the line 66 may shift vertically as the colors of target 30 fade. In particular, one or more of the portions 68, 70, and/or 72 may shift over time as one or more areas of target 30 fade, as shown by the dashed line segments 68A, 70A, and 72A, respectively. Controller 120 may be configured to apply different criteria for each of the reference image line segments 68, 70, and 72 relative to the faded image line segments 68A, 70A, and 72A, respectively. For example, an alert may be generated if the distance between lines 68 and 68A exceeds a first amount, and a signal may also be generated if a vertical distance between the lines 70 and 70A exceeds a second amount, wherein the second amount is not equal to the first amount. Similarly, controller 120 may be configured to generate an alert signal if the vertical distance between lines 72 and 70A exceeds a third amount that is not equal to the first or second amounts. In this way, an alert can be generated if any one of a plurality of fading criteria is present. For example, first line portion 68 may correspond to a first color, line portion 70 may correspond to a second color, and line portion 72 may correspond to a third color. Different fading criteria can be utilized for each of the three colors, such that larger amounts of fading of certain colors may be required to generate an alert signal.

Figure 9:
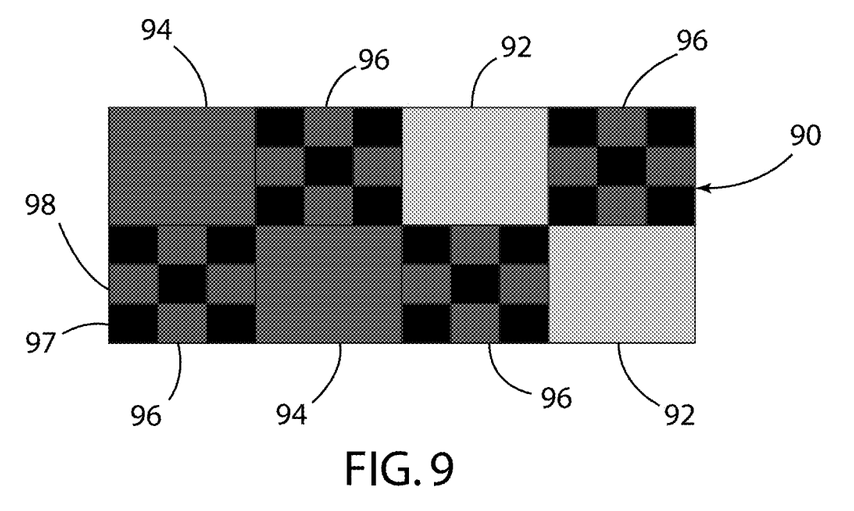
FIG. 9 is a drawing of a color target according to one aspect of the present invention.
Figure 10:
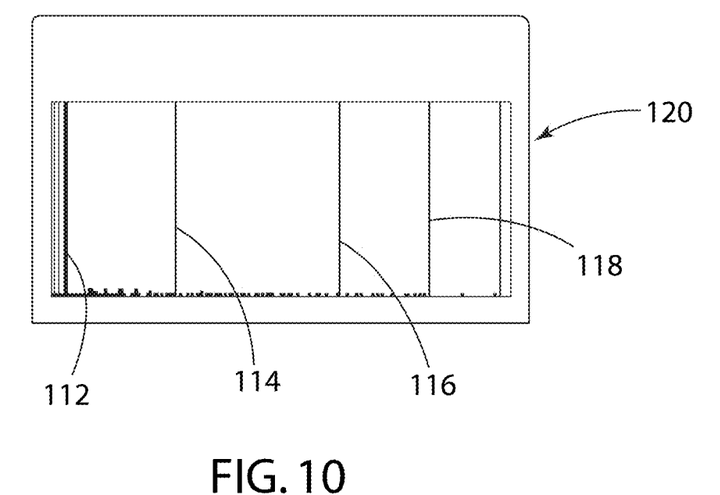
FIG. 10 is a histogram showing the number of pixels at different wavelengths of light for the image of FIG. 9.

With further reference to FIG. 9, a target 90 according to another aspect of the present invention includes a plurality of green squares/areas 92, a plurality of red squares/areas 94, and a plurality of areas 96 comprising smaller black squares/areas 97 and smaller grey squares/areas 98. With reference to FIG. 10, an image histogram 120 may be generated utilizing image data from camera 20. The image histogram 120 includes a plurality of vertical lines or bars 112, 114, 116, and 118 that correspond to the black areas 97, the grey areas 98, the green areas 92, and the red areas 94, respectively, of the target 90 of FIG. 9. In general, the vertical lines 112, 114, 116, and 118 may have a vertical height that is linearly proportional to the number of pixels at each of the wavelengths of the areas/squares 97, 98, 92, and 94, respectively. It will be understood that separate greyscale, red, and green image histograms may be utilized, or the image histograms may be combined into a single image histogram as shown in FIG. 10. Various types of image histograms are known, and the image histogram of FIG. 10 is merely an example of one possible image histogram.

Figure 11:
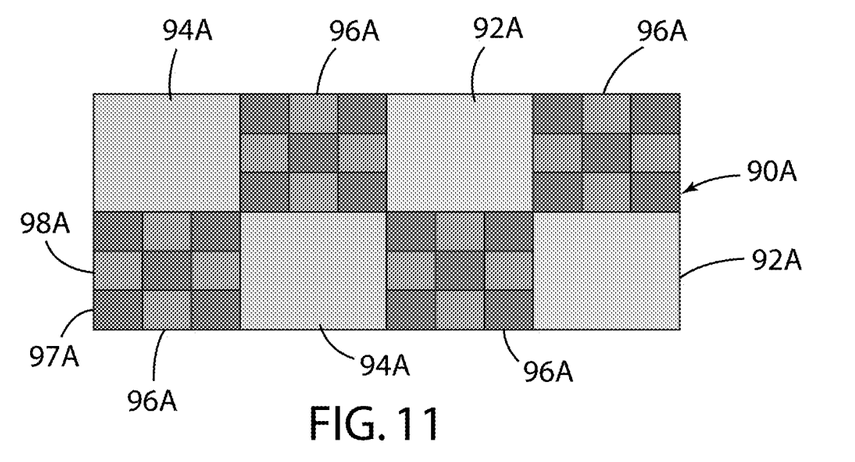
FIG. 11 is a colored drawing of the target of FIG. 9 after the target has faded.
Figure 12:
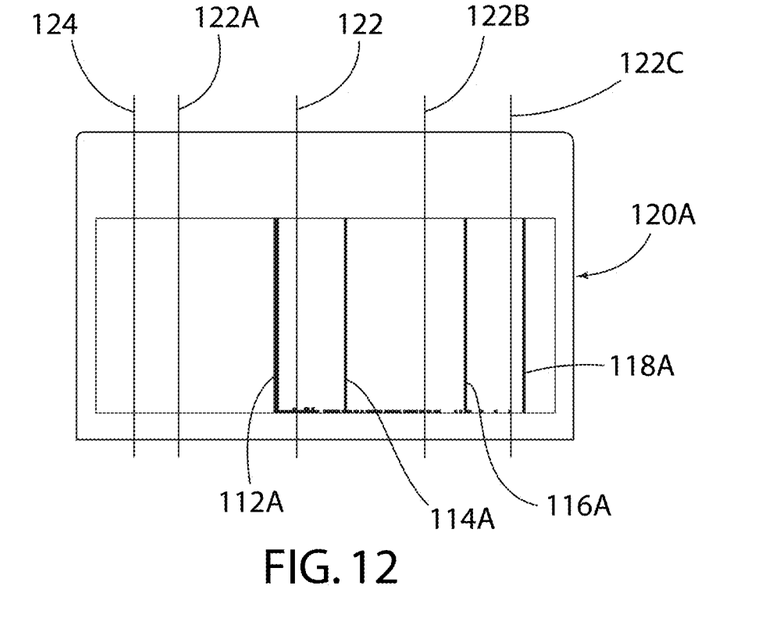
FIG. 12 is a histogram showing the number of pixels at different wavelengths of light for the image of FIG. 11.

With further reference to FIG. 11, after the target 90 has been exposed to environmental conditions for a period of time, the target 90 will fade to form a faded target 90A. Faded target 90A includes faded green areas 92A, faded red areas 94A, and faded grey areas 97A and 98A corresponding to the areas 92, 94, 97 and 98, respectively, of FIG. 9. As shown in FIG. 12, an image histogram 120A corresponding to the faded target 90A can be generated utilizing image data from camera 20. As a result of the fading, the vertical lines 112, 114, 116, and 118 of FIG. 10 may shift to the right as shown by the bars or lines 112A, 114A, 116A, and 118A, respectively, of FIG. 12. The control module 120 or other suitable controller may be utilized to evaluate the data corresponding to the image histograms 120 and 120A to determine if an alert to the user is required. For example, a vertical line 122 (FIG. 12) may be utilized as a criteria to determine if fading has occurred, and an alert/warning may be generated if a predefined percentage of the pixels appear to the right of the line 122. An alert/warning may be generated if a predefined percentage (e.g. 50%, 80% or 90%) of the total number of pixels are to the right of the line 122. Tests may be conducted to determine an amount of fading that is likely to result in unreliable operation of the trailer backup assist system, and the criteria utilized to generate an alert/warning (e.g. the position of line 122) may be chosen to ensure that an alert/warning is generated before fading of target 90 is sufficient to interfere with the reliable operation of the trailer backup assist system. It will be understood that the controller need not generate actual image histograms 120 and/or 120A, and the controller does not necessarily need to generate an actual vertical line 122. It will be understood that the image histograms of FIGS. 10 and 12 are provided as an illustration of the concepts utilized to determine if a warning concerning fading is required, but the present invention is not limited to the specific histograms or criteria described herein. Also, as discussed below, a series of image data sets (e.g. image histograms) may be generated at regular time intervals, and the image data sets may be stored and evaluated to determine trends in the fading of the target. Variations in the image data can be accounted for by generating error bars or confidence intervals, and one or more alerts/warnings may be generated if the sets of image data demonstrate that there is a high likelihood that the target has faded sufficiently to result in unreliable operation of the trailer backup assist system.

The controller may also be configured to generate an alert/warning before the target fades enough to prevent proper operation of the camera 20 and trailer backup assist system. For example, the position of the line 122 and/or the criteria utilized to generate a target fade warning may be selected such that a target fade alert/warning is generated before the target 90 fades enough to prevent proper operation of the trailer backup assist system. Empirical data concerning the rate of fade of target 90 may be developed, and one or more alerts/warnings may be generated based on the estimated time until the target 90 no longer permits proper/reliable operation of the backup assist system. For example, a first warning criteria may correspond to target fading at which the target has an estimated 6 months of useful life remaining once the first criteria is met, an alert/warning may be generated. This alert/warning may include specific information concerning the estimated remaining life of the target. For example, the warning may comprise an audio and/or visual message such as "warning, replace target within 6 months."

A second fade alert/warning criteria corresponding to a shorter estimated useful life of the target 90 may also be utilized. For example, image fade criteria corresponding to an estimated three months of useful target life may be developed, and a second alert/warning signal may be generated if the second criteria is met. Referring again to FIG. 12, the first fade criteria may comprise a vertical line 122A, and the second criteria may comprise a second vertical line 122B.

Furthermore, an estimated target fade rate may be utilized to generate fade alerts/warnings even if updated image data is not available. For example, if trailer 110 having a target 90 is disconnected from vehicle 100 for a period of time (e.g. 3 months, 6 months, etc.), an estimated target fade rate may be utilized in connection with the last available target data to generate a fade alert/warning even though the trailer is not presently attached to vehicle 100. For example, a baseline target fade rate may be developed based on testing, and this fade rate may be utilized to provide a default fade rate to estimate the useful remaining target life. The default fade rate may comprise an average fade rate for a plurality of targets under different use conditions, or it may comprise a "worst case" fade rate corresponding to the highest fade rate observed during testing.

The default fade rate may be utilized to generate one or more alerts/warnings at, for example, 3 months and/or 6 months prior to the estimated critical date at which the target 30 is faded sufficiently to result in unreliable operation of the backup assist system. An alert/warning may also be generated at the estimated critical date using the default fade rate.

If one or more image data sets have been generated after the initial image data set, the image data sets may be utilized to determine an estimated fade rate. The estimated fade rate can then be utilized to generate alerts/warnings concerning the target fading even if the trailer has been disconnected and more recent image data sets are therefore not available.

Also, the camera 20 and/or other components of the backup assist system may be configured for use with a plurality of targets 30 on a plurality of trailers. Each target 30 may have a unique barcode or other suitable identification feature that can be recognized by camera 20 and/or other components. A user can position a unique target 30 on each trailer that is used with a vehicle 100. The system can be configured to associate the sets of image data with each unique target 30 and generate alerts/warnings for each target 30. The HMI device 102 (FIG. 4) may be configured to allow a user to input identification information that is associated with each target 30. For example, if a user applies a first target 30 to a boat trailer, and a second target to a camper trailer, this information may be input utilizing HMI device 102. Alerts/warnings specific to each target 30 (e.g. "replace target on camper trailer") can then be generated.

Additional criteria may also be utilized to alert/warn a user that the image 90 has faded to such an extent that it is likely to interfere with proper operation of the backup assist program such that immediate replacement is necessary. This criteria could comprise a third vertical line 122C as shown in FIG. 12.

It will be understood that the camera 20 and/or controller may be configured to compensate for the color and/or intensity of light incident on the target 90. This process is generally known as a "white balance." An example of this process is disclosed in U.S. patent application Ser. No. 14/290,243, now U.S. Pat. No. 9,732,274 issued on Aug. 1, 2017, which is incorporated herein by reference. The image histograms 120 and 120A may be based on the number of pixels at various wavelengths after the images have been processed utilizing the white balance.

Furthermore, the camera 20 and/or controller may be configured to generate an alert/warning only if a consistent trend indicative of fading is detected. For example, referring again to FIG. 12, the camera 20 and/or controller may be configured to generate a first alert/warning signal if a predefined percentage of pixels are to the right of the vertical line 122A. However, the camera 20 and/or controller may be configured to additionally require that a "temporary" line 124 corresponding to, for example, a position at which 90% of the pixels are to the right of the line 124 moves consistently to the right until it reaches the alert/warning criteria line 122A. It will be understood that various fade trend criteria may be utilized, and the temporary line 124 is merely an example of one possible fading trend determination.

Figure 13:
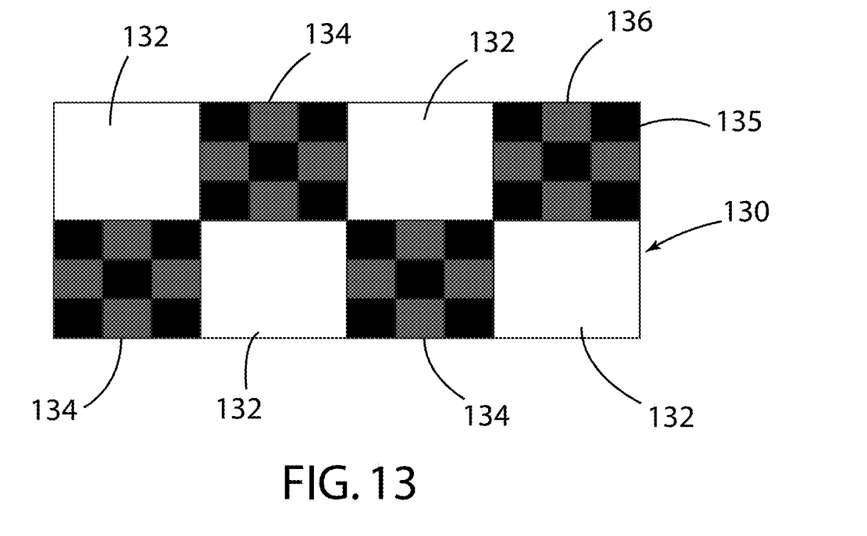
FIG. 13 is a drawing of a black and white target according to another aspect of the present invention.
Figure 14:
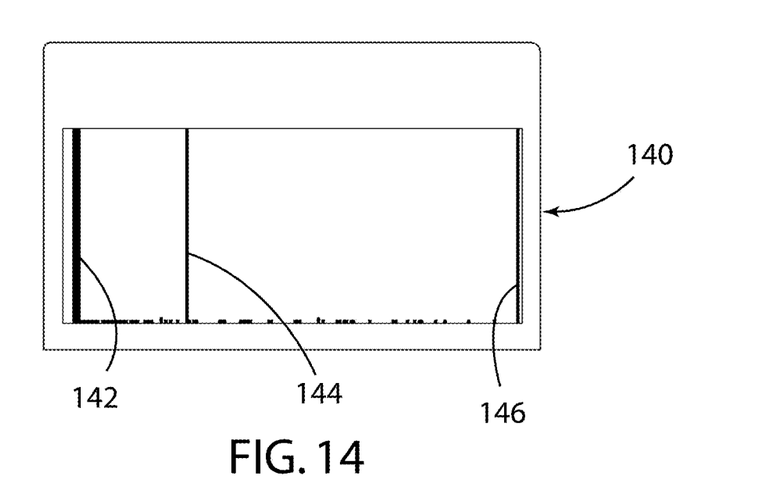
FIG. 14 is a histogram showing the number of pixels at different grey levels of the target of FIG. 13.

With further reference to FIG. 13, a target 130 according to another aspect of the present invention includes white regions 132 and black and grey regions 134. The black and grey regions 134 include a plurality of smaller black squares 135 and smaller grey squares 136. With further reference to FIG. 14, an image histogram 140 includes a plurality of vertical lines or bars 142, 144, and 146. The bars or lines 142, 144, and 146 correspond to the number of black, grey, and white pixels in an image of target 130, respectively.

Figure 15:
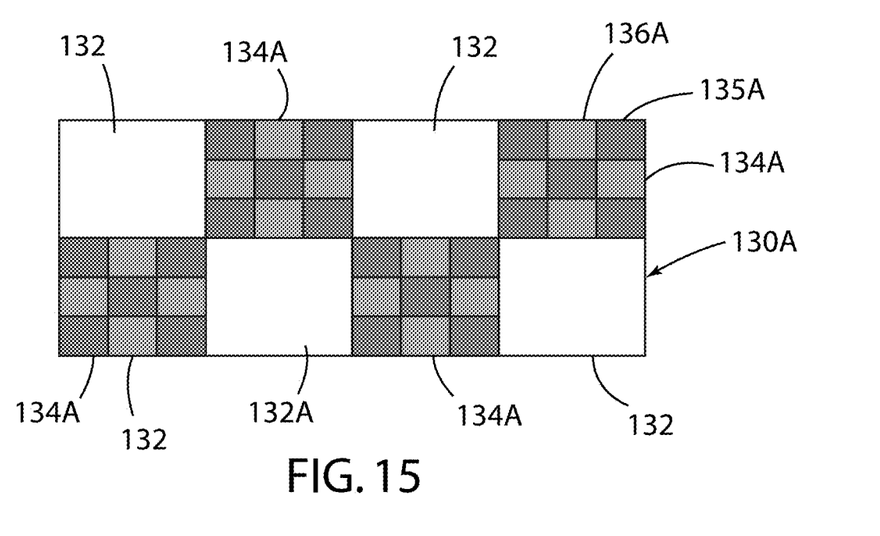
FIG. 15 is a drawing of the black and white target of FIG. 13 after the target has faded.
Figure 16:
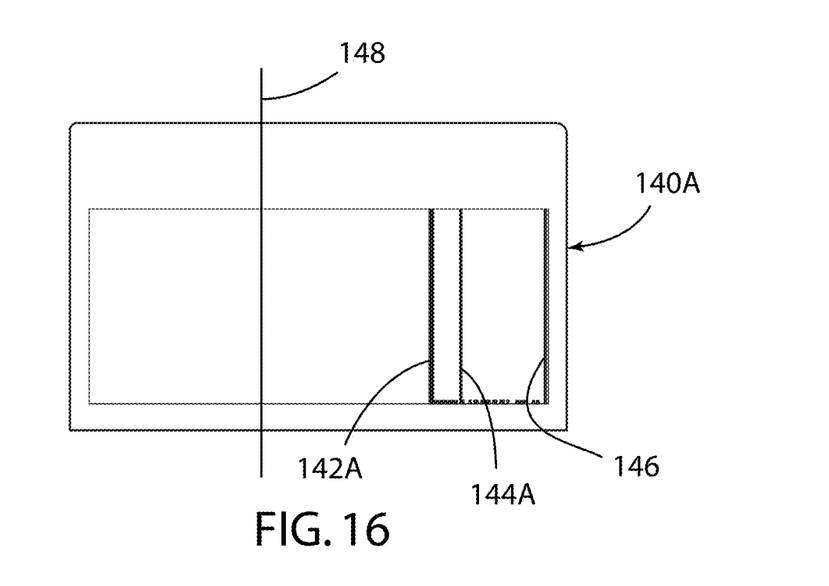
FIG. 16 is a histogram of the target of FIG. 15 showing the number of pixels at different levels of grey.

With further reference to FIG. 15, after a period of time, the target 130 fades to form a faded target 130A. Faded target 130A includes dark grey areas 135A corresponding to black areas 135 (FIG. 13), and light grey areas 136A corresponding to grey areas 136 (FIG. 13). With further reference to FIG. 16, an image histogram 140A corresponding to the faded target 130A includes a vertical bar or line 142A corresponding to the dark grey areas 135A (FIG. 15). In general, line 142 (FIG. 14) shifts to the right to the position 142A (FIG. 16) as the black areas 135 fade from black (FIG. 13) to dark grey (FIG. 15). Similarly, line 144 corresponding to the grey areas 136 and 136A of FIGS. 13 and 15, respectively, shifts to the right as the grey regions 136A fade to form the light grey regions 136A. In general, the white areas 132 do not fade, and the vertical bar or line 146 therefore does not change as the target fades.

Various criteria may be utilized to evaluate the fading of a black and white target 130 (FIG. 13). The criteria may be similar to the criteria discussed in more detail above in connection with FIGS. 9-12. For example, the number of pixels or the percentage of pixels disposed to the right of a vertical line 148 (FIG. 16) may be utilized as the criteria to generate a warning to a user that the target 130 needs to be replaced. In general, a plurality of vertical lines or a plurality of other criteria may be utilized to generate a plurality of warnings at different times corresponding to specific predicted remaining target life time periods. As discussed above, the system may be configured to require a consistent trend indicative of fading prior to generating a warning signal.

It will be understood that the targets and/or image histograms of FIGS. 5-16 are merely examples of image data and fade criteria that may be utilized to generate an alert/warning. Various image data and criteria may be utilized to determine if a predefined amount of fading has occurred whereby the controller 120 generates an alert/warning to a user 2.

Figure 17:
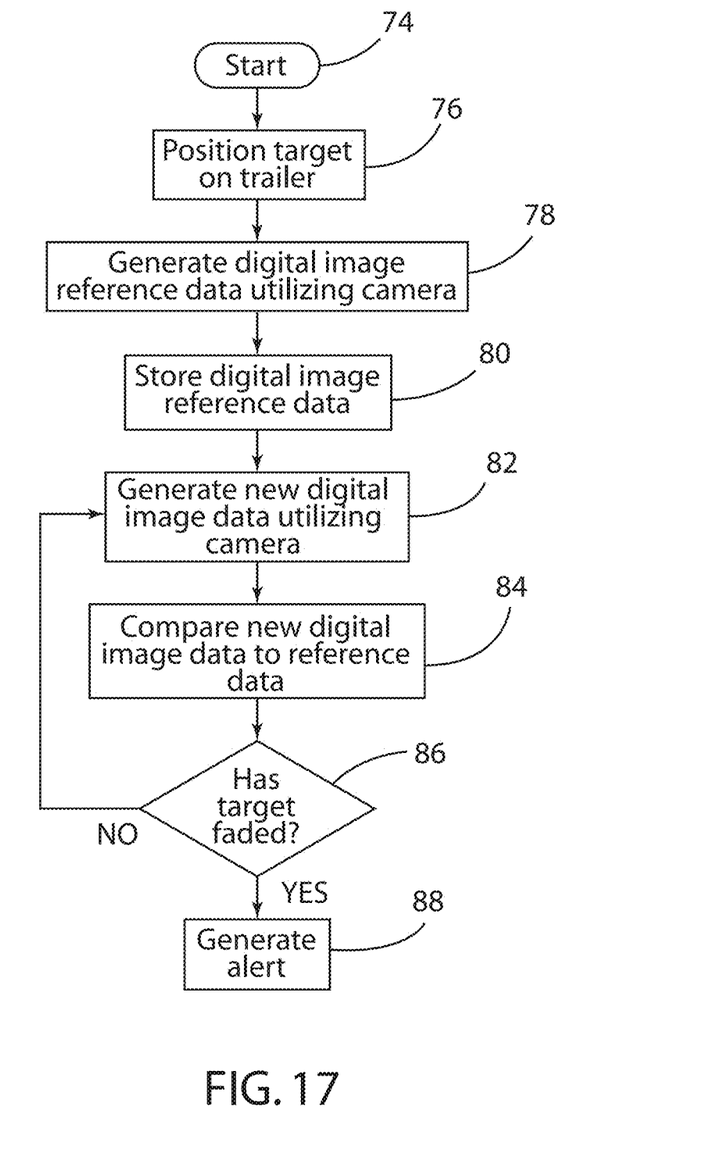
FIG. 17 is a flow chart showing a method or process according to one aspect of the present invention.

With further reference to FIG. 17, a method or process according to the present invention starts as indicated at step 74. If a target 30 has not been positioned on trailer 110, a target 30 is positioned on trailer 110 at step 76. Digital image reference data is then generated at step 78 utilizing a digital camera 20 or other suitable device. The digital image reference data is then stored as shown at step 80. New digital image data is then generated utilizing camera 20 as shown at step 82. The new digital image data is then compared to the reference data as shown at step 84. If the target has faded (step 86) an alert is generated as shown at step 88. If the target has not faded (i.e. the differences between the new digital image data and the reference data do not exceed the predefined criteria), new digital image data is again generated at step 82, and the new digital image data is again compared to the reference data at step 84.

In general, controller 120 may be configured to generate a series of digital image data sets at predefined time intervals. For example, new sets digital image data may be generated utilizing camera 20 once every 24 hours, once a week, or at other set time periods. The new digital image data sets may also be generated each time vehicle 100 is started (e.g. the ignition of vehicle 100 is switched to an "ON" state). Also, as discussed above, a series of image data sets can be generated, and the system may be configured to generate fade trend data and generate a warning only if predefined fade trend criteria exist.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of alerting a user that an optical target on a trailer needs to be replaced, the method comprising:
   generating a first set of data corresponding to optical characteristics of an optical target on a trailer;
   generating a second set of data corresponding to optical characteristics of an optical target on a trailer at least twenty four hours after generating the first set of data; and
   providing an alert indicating that the optical target on the trailer needs to be replaced if differences between the first and second sets of data exceed predefined criteria indicating that the target has: 1) degraded due to changes in a material forming the optical target that are not a result of environmental lighting changes, or 2) is likely to degrade due to changes in a material forming the optical target that are not a result of environmental lighting changes within a predefined period of time.

2. The method of claim 1, wherein:
   the first and second sets of data comprise digital image data that is generated utilizing a digital camera that is mounted on a vehicle.

3. The method of claim 1, wherein:
   the first and second sets of data are generated utilizing a hand held portable electronic device.

4. The method of claim 1, wherein:
   the first and second sets of data comprise light intensity data;
   the predefined criteria comprises a difference in light intensity between the first and second sets of data.

5. The method of claim 4, wherein:
   the predefined criteria comprises a difference in the intensity of light within a predefined range of wavelength of light.

6. The method of claim 5, wherein:
   the target includes at least one region that is red in color; and
   the predefined range of wavelengths of light corresponds to red light.

7. The method of claim 5, wherein:
   the target includes at least one region that is green in color; and
   the predefined range of wavelengths of light corresponds to green light.

8. The method of claim 1, wherein:
   the first and second sets of data comprise greyscale pixels; each pixel having intensity information associated therewith;

the target includes at least one region that is initially black in color; and the predefined criteria comprises a predefined percentage of the pixels having an intensity below a predefined level.

9. The method of claim 1, wherein:

the target comprises at least one region defining a color that fades over time; and the predefined criteria comprises a difference between the first and second sets of data indicating that the at least one region has faded by at least a predefined amount.

10. The method of claim 1, including:

providing first and second optical targets on first and second trailers, the first and second optical targets having first and second identification features respectively; and utilizing the first and second identification features to identify the first and second optical targets whereby the fading of the first and second optical targets can be determined.

11. The method of claim 1, wherein:

the first and second sets of data are utilized to predict a replacement date when the optical target will have degraded sufficiently to require replacement; and providing an alert at the predicted replacement date and/or prior to the predicted replacement, date.

12. A method of replacing a target on a trailer, comprising:

generating first and second images of a target on a trailer at first and second times utilizing a vehicle-mounted camera;

generating first and second sets of image data corresponding to the first and second images;

generating an alert if the first and second sets of image data indicate target fading not caused by changes in lighting has occurred; and removing and replacing the target.

13. The method of claim 12, wherein:

the target includes a first region that is a first color, and a second region that is a second color having highly visible contrast relative to the first color;

at least one of the first and second colors tends to fade over time;

the first and second sets of image data comprise histograms that include color-specific data corresponding to at least one of the first and second colors; and:

the predefined criteria comprises a difference in at least one of a brightness of the color-specific data and a saturation of the color-specific data.

14. The method of claim 12, including;

determining a contrast for at least the second set of image data;

generating an alert if the contrast does not meet predefined criteria.

15. The method of claim 12, including:

determining first and second contrasts for the first and second sets of image data, respectively; and generating an alert if a difference between the first and second contrasts exceeds a predefined amount.

16. The method of claim 12, wherein:

the first and second sets of image data include data concerning at least one of red, green, and blue light.

17. The method of claim 12, including:

generating at least one image histogram utilizing a selected one of the first and second sets of image data.

18. A system for detecting degradation of a target on a trailer, the system comprising:

a target defining a plurality of optical properties, wherein the target is configured to be mounted to a trailer;

a camera configured to generate image data of the target utilizing light from the target to provide input to a trailer backup assist system;

a controller configured to utilize image data from the camera generated at chronologically spaced first and second times to determine if at least a selected one of the optical properties of the target has degraded according to predefined criteria; and wherein:

the system is configured to generate an alert if the selected one of the optical properties of the target has degraded due to changes in light from the target that are not due to changes in environmental lighting conditions according to the predefined criteria.

19. The system for detecting degradation of a target on a trailer of claim 18, wherein:

the controller is configured to process the image data utilizing a white balance process to compensate for a color and/or intensity of light incident on the target to thereby changes in the image resulting from environmental lighting changes prior to determining if an optical property of the target has degraded, and:

wherein the controller is configured to generate at least first and second image histograms utilizing the image data from the first and second times, and wherein the controller is configured to utilize differences between the first and second image histograms to determine if at least a selected one of the optical properties of the target have degraded according to the predefined criteria.

20. The system for detecting degradation of a target on a trailer of claim 19, wherein:

the target includes a first region that is a first color, and a second region that is a second color that contrasts the first color; and the controller is configured to generate an alert if at least one of the first and second colors has faded according to the predefined criteria.

* * * * *